June 14, 1966  C. O. GLASGOW  3,255,574
METHOD AND MEANS FOR TREATING OIL WELL EMULSIONS
Original Filed March 16, 1965  3 Sheets-Sheet 1

INVENTOR.
CLARENCE O. GLASGOW
BY
Arthur L. Wade
ATTORNEY

June 14, 1966   C. O. GLASGOW   3,255,574
METHOD AND MEANS FOR TREATING OIL WELL EMULSIONS
Original Filed March 16, 1965   3 Sheets-Sheet 2

INVENTOR.
CLARENCE O. GLASGOW
BY
ATTORNEY

INVENTOR.
CLARENCE O. GLASGOW
BY
ATTORNEY

United States Patent Office 3,255,574
Patented June 14, 1966

3,255,574
METHODS AND MEANS FOR TREATING OIL WELL EMULSIONS
Clarence O. Glasgow, Tulsa, Okla., assignor to National Tank Company, Tulsa, Okla., a corporation of Nevada
Continuation of abandoned application Ser. No. 444,905, Mar. 16, 1965, which is a continuation of abandoned application Ser. No. 207,137, June 4, 1962, which in turn is a continuation of abandoned application Ser. No. 800,695, Mar. 20, 1959. This application Aug. 23, 1965, Ser. No. 481,783
4 Claims. (Cl. 55—42)

This application is a continuation of my copending application Serial No. 444,905, filed March 16, 1965, which was a continuation of my application Serial No. 207,137, filed June 4, 1962, now both abandoned, which was a continuation of my application Serial No. 800,695, filed March 20, 1959, now abandoned, which was a continuation-in-part of my application Serial No. 793,596, filed February 16, 1959, now Patent 3,009,536.

The present invention relates to methods and means for heat-treating oil well production. More particularly, the invention relates to methods and means for applying heat to oil well emulsions in a horizontal type of heat-treating vessel so as to utilize the natural tendency of the various fluids of the oil well production to separate from each other.

When heat is applied to an oil well production stream to break it into its components a vessel is customarily employed to collect the fluids so a heat source can heat exchange with the fluids. There are valid reasons for extending the treating vessel horizontally. However, at least one general problem of horizontal vessels is found in properly flowing the fluids through the vessels while the fluids pass vertically over a heat source and associated structure.

Another problem, in any form of treater, is found in adding production to the vessel continuously in a way which prevents disturbance of the treating process which includes the separation of the oil and water components of the production. When production is added continually to a vessel at a point either below the upper level of the water strata or above the lower level of the oil stratum, a continual mechanical disturbance usually results, with subsequent delay in the separation process. Also, if the production is not substantially degassed prior to passing the production directly over the heat source, the gas developed as the production is brought to its highest temperature will additionally disturb the treating process and the subsequent separation.

Another problem exists in both conserving heat from the source within the vessel and in bringing the production up to treating temperature as rapidly as possible. It is common to provide an external heat exchanger in which treater oil passed to storage can be made to transfer its heat to production being passed to the treating process. Obviously the provision of the external heat exchanger is both an economic and structural problem.

A primary object of the present invention is to apply heat from a heat source mounted within a horizontal vessel to a stream of oil well production before the production is passed directly over the heat source and to effectively insulate the heat source with the production against loss through the vessel wall.

Another object of the invention is to preheat the production from the heat source before passing the production over the heating source and to substantially degas the production and to then introduce the preheated production to the heat source directly with a minimum of disturbance to the treating and separation process.

The present invention contemplates providing a horizontal treater with a heater mounted therein and a hood structure arranged over the heater to form a jacket-chamber about the heater for the reception of oil well production to be treated. The production is passed down over the hood surface so the production will form as a layer of insulation against the escape of heat to and through the vessel walls.

The invention further contemplates the production being preheated by passage over the hood to the degree which will give a substantial amount of degassing of the liquids of the production. Further, the hood is extended far enough below the heater to provide for the liquids being introduced to the heat-treating zone about the heater below the heat source as distributed by the lower ends of the hood along substantially the complete horizontal length of the zone and heater.

The invention further contemplates provision of a large surface area for the liquids of the production immediately following the direct heat-treating of the liquids by the heat source prior to their entry into a coalescence structure.

Other objects, advantages and features of this invention will become more apparent to one skilled in the art upon consideration of the written specification, appended claims, and attached drawings, wherein:

Figure 1:
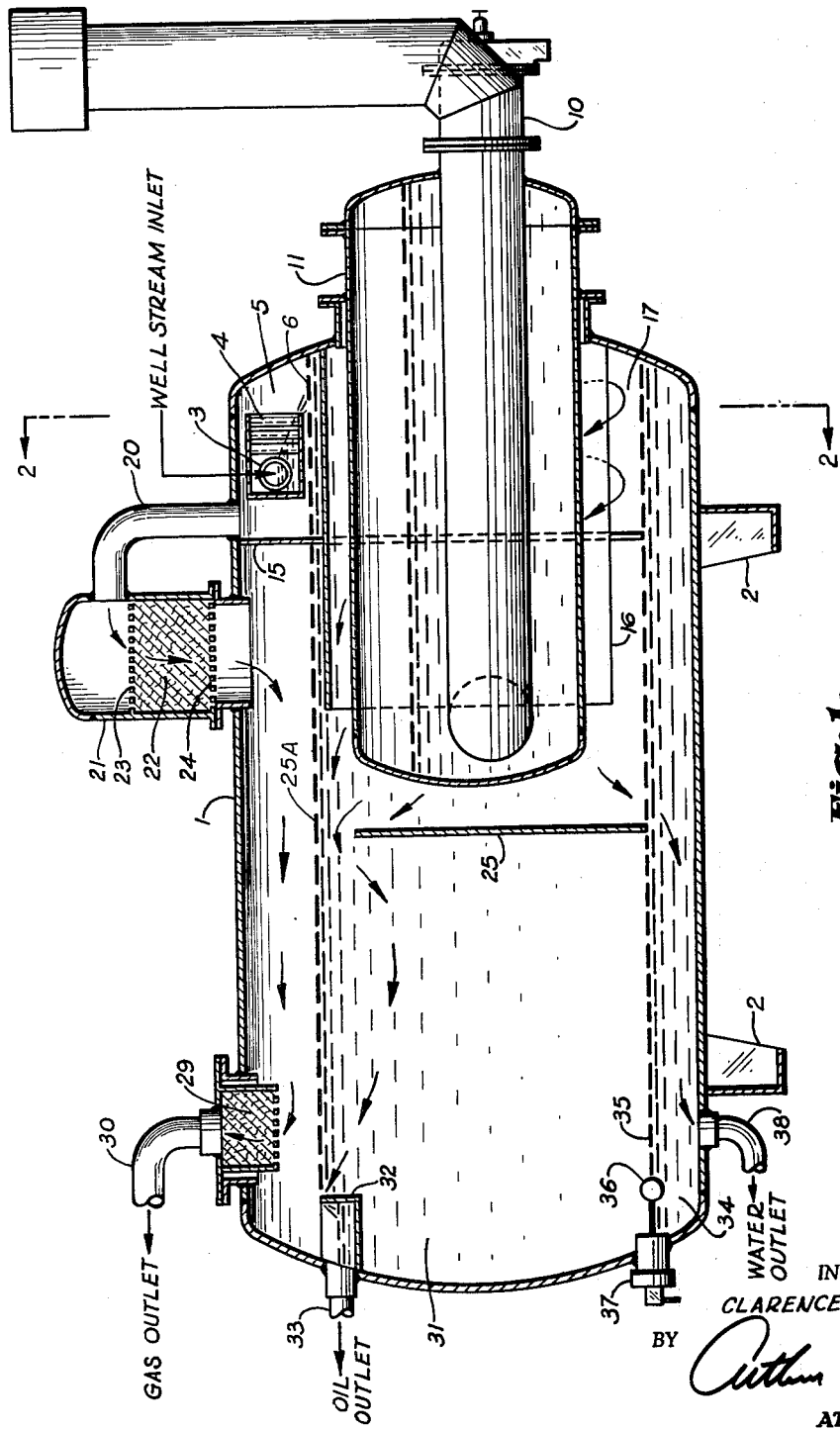
FIG. 1 is a diagrammatic sectioned elevation of a treating apparatus embodying the present invention.
Figure 2:
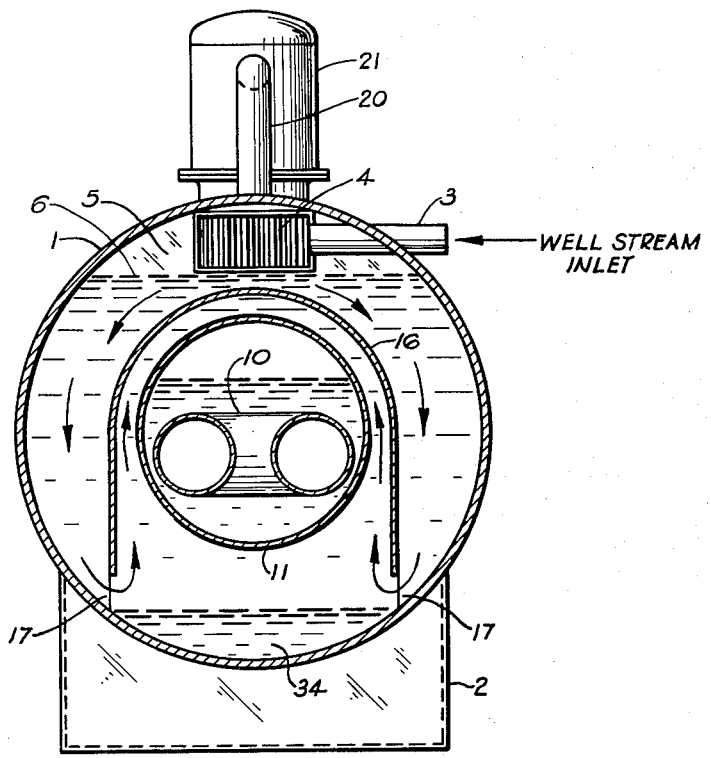
FIG. 2 is a sectioned end elevation of the apparatus of FIG. 1 along lines 2—2.

FIGS. 1 and 2 have been established to illustrate a simple embodiment of the present invention. The shell 1 of a treater vessel is illustrated diagrammatically, in sectioned elevation, so the internal structure may be clearly seen, carrying out the objects of the invention. Shell 1 is conventionally referred to as an elongated horizontal form of treater vessel. Support legs 2 represent a wide variety of means for carrying shell 1 in its characteristic horizontal position in which it treats oil well production.

Oil well production varies widely in characteristics. In general, it is composed of liquids and gases. The gases may vary in quantity and the amount of hydrocarbons they contain. The liquids may consist of oil, water, and an emulsion of oil and water. The general objective of the process and apparatus disclosed here is to separate the oil well production into its components quickly and efficiently.

The entire production is brought into shell 1 with inlet conduit 3. Conduit 3 is shown entering shell 1 from its side, and near one end. An assembly 4 of vertical angle irons is mounted on the end of conduit 3, within shell 1, so the production will impinge thereon and mechanically break out gaseous components of the well stream and distribute the well stream evenly through the upper portion of the compartment in which the assembly 4 is mounted.

Assembly 4 is mounted in the top of a jacket-chamber 5. Jacket-chamber 5 is formed within the wall of shell 1, about the source of heat with which the well stream is heated. The liquids of the production have a level 6 in jacket-chamber 5. At level 6, the liquids form a surface from which gas, which was not broken out of the well stream by assembly 4, will disengage. As the liquids of the well stream pass downwardly within jacket-chamber 5, gas evolved will travel vertically up to the surface at level 6 and disengage from the liquids into the gas space above the liquids.

The source of heat for vessel 1 is embodied in a vapor-phase heater including a firetube 10 inserted into a shell 11. Shell 11 contains a liquid, conventionally water, about firetube 10 within shell 11. Heat applied to the liquid generates vapor and the heat of the liquid and vapor is transmitted through the wall of shell 11 to the production liquid collection within shell 1.

Jacket-chamber 5 extends about shell 11 so as to form an insulation between the wall of shell 1 and the wall of heater shell 11. Shell 11 is, itself, extended horizontally along the axis of shell 1. Shell 11 can be seen, in FIG. 1 to extend beyond jacket-chamber 5, into shell 1. The limits of jacket-chamber 5 are additionally defined by a baffle 15 mounted on the internal wall of shell 1 so as to extend transverse to the axes of both shell 1 and shell 11. The hood 16 is mounted from the end of the internal wall of shell 1 in which shell 11 is mounted to join with partition 15 and extend beyond, substantially the horizontal length of shell 11. The resulting combination of the internal wall of shell 1, partition 15, and hood 16 form jacket-chamber 5 which maintains a layer of oil well production liquids over and above shell 11.

As can be seen from FIG. 2, hood 16 has the cross-section of an inverted U shape, the legs of which terminate short of the lower internal wall of shell 1. Partition 15 extends a distance below the ends of the legs of hood 16. Passages 17 are provided between the ends of hood 16 legs and the internal wall of shell 1 to introduce the liquids of production from jacket-chamber 5 beneath heater shell 11. The oil and emulsion of the liquids is then passed through passages 17, along the length of the hood 16, from the end of shell 1 to partition 15. The elongated shape of passages 17 spreads the emulsion along substantially the complete horizontal length of heater shell 11. Also, with this view, the travel of gas evolved by heating the liquids which are passed downwardly can be understood as rising vertically to the surface of liquids at level 6. The evolved gas will rise countercurrent to the comparatively slow moving downflow of the liquids and disengage into the gas space above the liquids.

Within hood 16, external of shell 11, a chamber is formed which is directly heated by shell 11 as a heater assembly. This volume extends the longitudinal length of hood 16 which is substantially the length of shell 11.

From the top of jacket-chamber 5, the gas conduit 20 removes gas evolved in jacket-chamber 5 upward into dome 21. Dome 21 contains a filter structure 22. Structure 22 may be made up of mesh of irregularly shaped and disposed metal ribbons held between plates 23 and 24. The combination is intended to function to scrub liquid components from a predominantly gaseous stream. Such liquid components are usually in the form of foam, and extractor 22 may be referred to as a breaker of this foam. In any event, there is delivered below plate 24 a gaseous fluid evolved in chamber 5 which is mixed with, and joins, the gas evolved beyond partition 15.

Beyond the internal end of shell 11, the vertical baffle 25 diverts the liquids flowing from beneath the hood 16. The lighter liquid components, consisting of emulsion and clean oil pass over the top of baffle 25 while the heavier components, consisting mainly of water, pass below partition 25.

As the liquids flow from beneath hood 16, through the volume extending to baffle 15, they are provided the large surface 25A extending from baffle 15. From this large surface for the directly heated liquids the gas evolved by the direct heating is given full opportunity to disengage from the liquids. With gas disengaged from the liquids at level 6 and this surface 25A, the liquids are better prepared for undisturbed coalescence of the oil.

After the liquid components of the production have passed over and under baffle 25, they are intended to have received sufficient heat to prepare them for the coalescence phase of treating. This coalescence of oil into a body of clean product and water into a body takes place in the compartment between baffle 25 and the liquid discharge outlets of shell 1.

Additional scrubbing of the gases in the upper portion of the shell are brought about by a body 29 before the gases are removed from the treater through conduit 30.

The clean oil product is collected in a body 31 which is skimmed through box 32 and passes out conduit 33.

The water collects in body 34 in the lower portion of the treater shell 1. Interface 35 is maintained between the oil and water by a float 36 actuating a control mechanism 37 to establish a fluid pressure control for a valve in water outlet conduit 38.

The apparatus in which the invention is embodied is expected to immediately begin the processing of the oil well production stream brought in to shell 1 through conduit 3. Jacket-chamber 5 forms a layer of the liquids of the production about the heat source, exemplified by the combination of firetube 10 and shell 11. The production through inlet conduit 3 is continually flowed into the layer of chamber 5. Further, the liquids of the production are moved downwardly, within this layer. A valve may be mounted in conduit 20 to develop any fluid pressure necessary to move these liquids downwardly. However, it is normally expected that the liquids will rise to the level which will develop the necessary head to maintain the downward flow.

As the liquids of the production flow downwardly they are brought into contact with the large heating surface provided by hood 16. This preheating of the production begins to develop free water which falls through passages 17 directly into collection 34 without further absorption of the valuable heat of heater 11. Of course, any foreign matter brought into the production also gravitates to the bottom of the shell 11 and is removed without coming into contact with heater 11.

At the exit of passages 17, the liquids of the production are distributed along heat source 11 as the liquids are released from chamber 5 below the heat source 11 to flow as distributed upwardly over the heat source and are thereby raised to their highest temperature. The preheating in chamber 5 developes a substantial amount of gaseous components of the production which rise vertically to disengage from the surface at level 6 and pass upwardly through conduit 20. Additionally, the layer of liquids in chamber 5 forms an insulation for a substantial amount of the heat source area, conserving the heat of the source by putting it to work in developing free water and preparing the production to be raised to its final treating temperature.

After the distributed oil and emulsion of the production flow upwardly over heat source 11 they are provided with a large area, the oil and emulsion being sent toward this surface by passing over the top of baffle 25. Once past baffle 25, the liquids enter the section of the shell where stratification of the oil and water of the liquids is completed to form the clean oil product 31 and water 34. The gas developed in chamber 5, and in the section beyond partition 15, is passed out conduit 30 while the clean oil passes out conduit 33 and the water is passed out conduit 38.

Figure 3:
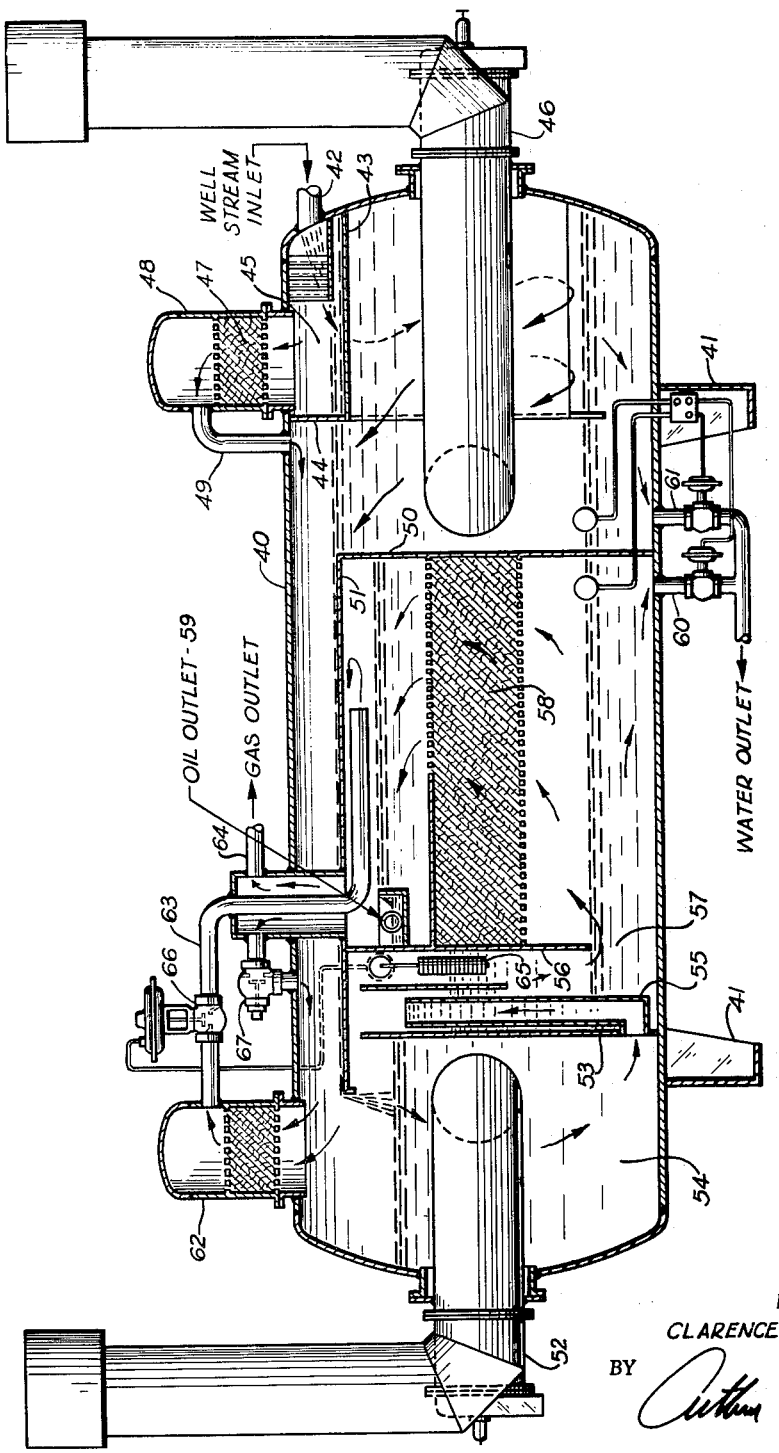
FIG. 3 is a diagrammatic sectioned elevation of another form of treating apparatus embodying the present invention.

FIG. 3 illustrates the invention embodied in a form of treater somewhat different from the form of FIGS. 1 and 2. The shell 40 is shown horizontally extended, as is shell 1, and supported by leg members 41. However, shell 40 has mounted in it a plurality of heat sources. The heat sources are mounted in each end of shell 40, and a coalescing section is mounted between them.

The conduit 42 brings the production stream into shell 40. A hood 43 and partition 44 form a jacket-chamber 45 very similar to jacket-chamber 5 of FIG. 1.

Firetube 46 is mounted within hood 43. Heat source 46 is not the vapor-phase form of heater in FIG.1, but is a simple firetube mounted within hood 43 so the liquids of the production flow from jacket-chamber 45 upwardly, over its surface.

Hood 43 is extended longitudinally into shell 40 far enough to flow the production liquids against its broad preheating surface. This preheating is followed by distributing the liquids under substantially the complete horizontal length of a heat source. Therefore, all of the benefits of an elongated heat-exchange path are derived from the invention embodied in this structure. Further, the gases developed in jacket-chamber 45 are removed through foam-breaking element 47 in dome 48. The gases developed in jacket-chamber 45 are then passed out of dome 48 through conduit 49 to a point beyond partition 44.

A partition 50, in this FIG. 3 treater, is extended from the bottom of shell 40 upward, terminating short of the top wall of the shell. A tray-baffle 51 joins with the top of wall 50 and extends horizontally a substantial distance along the length of shell 40.

In the opposite end of shell 40 a second source of heat is embodied in firetube 52. Firetube 52 is mounted in the opposite end of shell 40 to heat liquids collected in the end section between a wall 53, extending up from the bottom of shell, and the end of shell 40. All of the liquids are removed from the lower portion of this compartment 54 by a siphon leg 55.

Siphon conduit 55 removes the liquids from compartment 54 into a compartment between wall 53 and a wall 56, depending from tray-baffle 51. Wall 56 terminates short of bottom of shell 40 to form a passage 57. All of the liquids pass through passage 57 and into coalescing section containing filter 58. The clean oil developed above filter 58 is removed through conduit 59.

The water gravitated to the bottom of the coalescing section is removed through a conduit 60 while the water gravitated to the bottom of the first heater compartment is removed through conduit 61. Interface controls in each of these compartments are shown in control of valves in conduit 60 and 61 to remove water as required to maintain the interface at a desired height.

This height in the first heater compartment is below firetube 46 so the heat of the firetube will go directly into the oil and emulsion which is distributed and then flows upwardly over the firetube.

The gas evolved from the production passed beyond partition 44 and along horizontal tray-baffle 51 in a relatively shallow body of liquids is joined with the gas of conduit 49 to pass out dome 62. Conduit 63 passes the dome 62 gas into the gas space above the clean oil product and the combined vapors pass out the treater through conduit 64.

A differential of pressure between that on the surface of the liquids to the left of wall 56 and that on the clean oil in the coalescing compartment is required to keep the liquids moving through the filter 58 and out conduit 59. A float 65 senses the level of liquids to the left of wall 56 and controls the position of valve 66 to maintain the required differential. A safety valve 67 is shown maintaining the maximum differential selected between these two treater sections to obtain the necessary fluid boosting of the liquids through the treater.

In principle, the operation of the apparatus in which the invention is embodied functions substantially the same as in the FIG. 1 treater. However, the second source of heat is utilized to raise the temperature of the production liquids, if required, to fully prepare the liquids for the coalescing treatment in the filter 58. The coalescing section is established between the two heat sources, and the heated liquids pass over tray-baffle 51 to add to the insulation of the coalescing section against heat loss. One result is a more even temperature for the all-important coalescing section which produces the final product of the process.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. The method of treating oil well production containing free water and free gas including,
    passing the production into a first confined zone,
    separating free gas from the production within the confined zone and maintaining a gas space in the upper part of the confined zone,
    maintaining a level for the liquids of the production below the gas space in the upper part of the confined zone,
    forming paths downwardly from the upper part of the confined zone and below the level of the liquids on the outer side of a partition in the form of a hood having a cross-section of inverted U shape said paths ending at the bottom of the inverted U,
    passing the liquids of the production downwardly in the paths from their level while heating the liquids with a source of heat mounted within the partition and releasing the gas developed from within the liquids as said liquids pass downwardly while passing the gas vertically upwardly in a substantially straight path to the surface of the liquid level and disengaging the gas from the liquids by passing the released gas vertically upward from the surface of the level into the gas space maintained in the upper part of the confined zone which gas space is entirely contained above the source of heat,
    collecting water into a body at the bottom of the paths and discharging water from the body to maintain a water level below the paths formed on the outer side of the hood partition,
    distributing only oil and emulsion of the liquids between the lower ends of the paths and the water level horizontally along the horizontal lengths of the paths,
    releasing the distributed oil and emulsion from the lower ends of the paths into only oil and emulsion directly heated by the source of heat to evolve additional gas and prepare the emulsion for coalescing the oil and water separately,
    flowing the directly heated oil and emulsion as a body of fluids provided with a large surface area above and away from the heat source following the direct heating of the oil and emulsion from which surface the additionally evolved gas is readily released from the liquids,
    passing the liquids through a zone of coalescence to coalesce the oil and water into separate bodies and migrate the oil upward and the water downward to separate the oil and water,
    and separately discharging the gas and oil and water from the process.

2. The method of claim 2 including,
    developing a differential between the force on the liquids in the outer paths and the liquids in the inner paths to force liquids from the outer paths to the inner paths.

3. A system for field-processing a stream of crude petroleum containing free water and free gas including,
    an elongated shell having its axis horizontally extended,
    a first compartment positioned in one end of the shell and connected to a stream of crude petroleum,
    a partition mounted within the first compartment and in the form of a hood having a cross-section of inverted U shape elongated along a horizontally extended axis arranged parallel to the horizontally extended axis of the elongated shell to form a first path between the outer surface of the partition and the inner surface of the compartment walls, the lower ends of the legs of the U shaped hood terminating above the bottom of the first compartment, means mounted in the first compartment above the partition-hood at a position where the incoming stream of crude petroleum will impinge thereon and facilitate the separation of free gas from the liquids of the stream, a conduit connected to the upper portion of the first compartment and controlled to withdraw gas from the top of the first compartment to form a level for the liquids of the production above the first path formed between the partition and walls, means to contain a gas space above said liquid level in the first compartment, a source of heat providing an elongated form and mounted to extend horizontally and parallel with the axis of the shell within the partition-hood to form a second path between the external surface of the heat source and the internal surface of the partition-hood, which second path is connected to the first path at the lower ends of the legs of the hood, the source of heat, the partition-hood and the walls being so constructed and arranged to raise the temperature of the liquids as they flow downwardly in the first path to release gas developed within the liquids to flow vertically upwardly in a substantially straight path to the surface of the liquid level where the gas disengages and passes vertically upward from the surface of the level into the gas space in the upper part of the first compartment, means for maintaining the level of water gravitating to the bottom of the first compartment at a level below the lower ends of the legs of the U shaped hood by discharging water from the production, and distributing only oil and emulsion along the horizontal lower ends of the legs of the U shaped hood and over the surface at the level of water before rising up the second path while directly heating only the oil and emulsion by the source of heat to evolve additional gas, means for establishing a large surface area above and removed from the source of heat for the directly heated oil and emulsion flowing from the second path from which additionally evolved gas is readily released from the liquids, a second compartment in the shell arranged to receive the liquids from the second path and in which the oil and water are separately coalesced, and conduits connected to the compartments of the shell for separate removal of the gas and oil and water.

4. The system of claim 3 including, means for maintaining the force exerted on the surface at the level of liquids in the first path greater than the force exerted on the large surface area of liquids in the second path to force liquid out of the first compartment.

References Cited by the Examiner

UNITED STATES PATENTS

| | | | |
|---|---|---|---|
| 2,601,903 | 7/1952 | Erwin | 55—42 |
| 2,601,904 | 7/1952 | Erwin | 55—42 |
| 2,619,187 | 11/1952 | Hayes et al. | 55—179 X |
| 2,626,007 | 1/1953 | Musslewhite et al. | 55—175 |
| 2,713,919 | 7/1955 | Walker et al. | 55—174 |
| 2,726,729 | 12/1955 | Williams | 55—174 X |
| 2,751,998 | 6/1956 | Glasgow | 55—45 |
| 2,783,854 | 3/1957 | Lovelady et al. | 55—174 |
| 2,786,543 | 3/1957 | Hayes et al. | 55—174 |
| 2,833,369 | 5/1958 | Laurence et al. | 55—174 |
| 2,868,312 | 1/1959 | Erwin | 55—174 |
| 2,868,313 | 1/1959 | Lauszler | 55—174 |
| 3,009,536 | 11/1961 | Glasgow | 55—45 X |
| 3,009,537 | 11/1961 | Glasgow et al. | 55—179 X |
| 3,012,629 | 12/1961 | Walker et al. | 55—271 |

REUBEN FRIEDMAN, *Primary Examiner.*

C. N. HART, *Assistant Examiner.*